(12) United States Patent
Einsla et al.

(10) Patent No.: US 7,473,714 B2
(45) Date of Patent: Jan. 6, 2009

(54) MATERIALS FOR USE AS PROTON CONDUCTING MEMBRANES FOR FUEL CELLS

(75) Inventors: Brian R. Einsla, Blacksburg, VA (US); James E. McGrath, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 445 days.

(21) Appl. No.: 11/119,353

(22) Filed: May 2, 2005

(65) Prior Publication Data

US 2005/0261442 A1    Nov. 24, 2005

(51) Int. Cl.
*B01J 49/00*    (2006.01)
*B01J 39/20*    (2006.01)

(52) U.S. Cl. .............. 521/27; 521/33; 429/33; 429/303; 429/306; 429/340; 429/345; 525/345

(58) Field of Classification Search .......... 429/33, 429/303, 306, 340, 345; 521/27, 33; 525/345
See application file for complete search history.

(56) References Cited

U.S. PATENT DOCUMENTS

| | | | |
|---|---|---|---|
| 6,670,065 B2 * | 12/2003 | Koyama et al. | ............. 429/33 |
| 2002/0061431 A1 | 5/2002 | Koyama et al. | |
| 2003/0096149 A1 | 5/2003 | Koyama et al. | |
| 2004/0033407 A1 | 2/2004 | Koyama et al. | |

FOREIGN PATENT DOCUMENTS

WO    WO 03082956 A1 * 10/2003

OTHER PUBLICATIONS

Guyu Xiao et al. "Sulfonated poly(thioether ketone)s with high oxidation resistance to peroxides", Polymer Preprints, 2003, 44(1), pp. 1235-1236.*
Shengzhou Liu et al. "Novel sodium sulfonate-functionalized poly(ether ether ketone)s derived from 4,4-thiodiphenol", Polymer, 42 (2001), pp. 3293-3296 (www.elsevier.nl/locate/polymer).*

* cited by examiner

*Primary Examiner*—Randy Gulakowski
*Assistant Examiner*—Michael M Bernshteyn
(74) *Attorney, Agent, or Firm*—Whitham Curtis Christofferson & Cook, PC

(57) ABSTRACT

A family of polymers having pendent sulfonate moieties connected to polymeric main chain phenyl groups are described. These polymers are prepared by the steps of polymerization (using a monomer with a phenyl with an alkoxy substitution), deportation by converting the alkoxy to a hydroxyl, and functionalization of the polymer with a pendant sulfonate group. As an example, sulfonated poly(arylene ether sulfone) copolymers with pendent sulfonic acid groups are synthesized by the direct copolymerization of methoxy-containing poly(arylene ether sulfone)s, then converting the methoxy groups to the reactive hydroxyl form, and finally functionalizing the hydroxyl form with proton-conducting sites through nucleophilic substitution. The family of polymers may have application in proton exchange membranes and in other applications.

14 Claims, 11 Drawing Sheets

| Copolymer | Ion Exchange Capacity (meq/g) | | Water Sorption (%) | Proton Conductivity* (S/cm) |
|---|---|---|---|---|
| | Calculated | Experimental | | |
|  | 0.29 | 0.3 | 6 | 0.001 |
| | 0.56 | 0.5 | 15 | 0.005 |
| | 0.80 | 0.9 | 20 | 0.008 |
|  | 0.29 | 0.2 | 8 | 0.002 |
| | 0.54 | 0.5 | 12 | 0.004 |
| | 0.75 | 0.7 | 18 | 0.008 |

MATERIALS FOR USE AS PROTON CONDUCTING MEMBRANES FOR FUEL CELLS

This invention was made with the assistance from a grant by the United States Department of Energy (No. DE-FC36-01G0 11086) and the U.S. Government may have certain rights in this invention.

BACKGROUND OF THE INVENTION

1. Field of the Invention

The present invention generally relates to proton exchange membranes (PEMs) used in fuel cells, as well as new materials and synthetic routes for producing the new materials which have particular application as PEMs.

2. Background Description

Recently, there has been considerable interest in the development of high performance and potentially lower cost PEM fuel cells for transportation, stationary and portable applications, as well as a myriad of other applications. The interest in fuel cells is largely due to their ability to continuously convert chemical energy into electric energy and heat with high efficiency and low emission of pollutants. In PEM fuel cells, the membrane must transport protons from the anode to the cathode, and act as a barrier to oxygen and the hydrogen rich fuel. At the anode, hydrogen is oxidized to protons and electrons by platinum or platinum/metal catalysts. Useful electrical energy is harnessed by moving the electrons through an external circuit before allowing them to reach the cathode. At the cathode, gaseous oxygen from the air is reduced and combined with the protons and electrons to form water.

Promising PEM fuel cell systems include high temperature hydrogen/air and direct methanol fuel cells (DMFC). In hydrogen/air based fuel cells, high temperature (e.g., >120° C.) provides benefits such as faster electrode kinetics and greater tolerance to impurities in the fuel stream. To operate at these high temperatures, new and improved mechanisms for conductivity above the boiling point of water are needed. DMFCs offer reasonably high fuel energy density, readily stored liquid fuel, ease of refueling, and direct and complete electro-oxidation of methanol at moderate temperatures. Nafion® perfluorosulfonic acid copolymers are the state-of-the-art membranes for DMFC and hydrogen/air fuel cells due to their high conductivity when hydrated and their chemical stability. However, there is much interest in alternative PEMs because of Nafion's® reduced performance above 80° C., significant methanol crossover, and cost.

Sulfonated poly(arylene ether)s have been extensively studied as candidates for proton exchange membrane (PEM) fuel cells. In particular, post-sulfonation of poly(ether ether ketone) (PEEK) and poly(ether sulfone) (PSU) generates proton-conducting copolymers with sulfonic acid sites from commercially available materials. Post sulfonation of Udel® (PSU) is generally accomplished with chlorotrimethylsilyl sulfonate, generated in-situ by reacting chlorosulfonic acid with trimethylchlorosilane. The degree of sulfonation can be controlled by varying the reaction time and mole ratio of sulfonating agent to the polymer. Due to the large amount of swelling in these membranes, the sulfonated copolymers can be intentionally or unintentionally crosslinked through the sulfonic acid groups, which results in a decrease in conductivity, swelling, and permselectivity. The reduction in conductivity is due to the loss of ion-conducting sites (sulfonic acid groups); though the membrane is still a viable material for PEMs.

Johnson and colleagues studied the substitution position of the sulfonate group (see, Johnson et al., *J. Polym. Chem. Ed.* 22:721-737 (1984)). It was found that the sulfonation only occurs in the Bisphenol A aromatic ring at the activated position ortho to the ether linkage and yields only mono-substitution per repeat unit, as shown below.

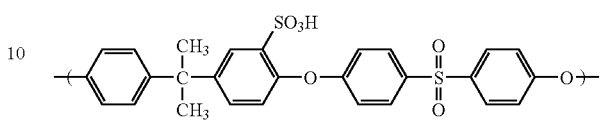

A disadvantage of this route is that the sulfonic acid sites are on the activated ring (as opposed to the rings adjacent to the sulfone linkage) and can undergo ipso-substitution with $H^+$. Therefore, the hydrolytic stability of the sulfonated polymer might be expected to be poor under strongly acidic conditions, such as those in a fuel cell.

In an effort to increase the hydrolytic stability of sulfonated Udel PSU, Kerres and colleagues developed a novel method to functionalize the position ortho to the sulfone group with sulfonic acid sites (see, Kerres et al., *J. Polym. Sci.: Part A: Polym. Chem.* 34:2421-2438 (1996)). The electron-deficient portion of the polymer backbone was lithiated in the presence of n-butyllithium, and then sulfinated by adding $SO_2$. The corresponding sulfinate groups were converted to proton-conducting sulfonic acid sites by oxidation and acidification.

While there are several routes to post-sulfonation of poly (arylene ether sulfone)s, precision and control are lacking with these methods. Additionally, the mechanical properties of these sulfonated copolymers suffer at high ion-exchange capacities (IECs) due to the random distribution of acid sites, and perhaps, to the fact that the sulfonic acid groups are directly attached to the polymer backbone.

A different approach to prepare sulfonated PSU was introduced by Ueda in 1993 (see, Ueda et al., *J. Polym. Sci.: Polym. Chem Ed.* 31:853-858 (1993)). Our research group modified this method to prepare wholly aromatic disulfonated poly (arylene ether sulfone)s (BPSH), and more recently fluorinated poly(arylene ether nitrile sulfone)s (6FCN) and fluorinated poly(arylene ether sulfone)s (6FSH). By utilizing a disulfonated monomer. disodium-3,3'-disulfonate-4,4'-dichlorodiphenylsulfone (SDCDPS), the sulfonic acid groups of the resulting copolymer are on the more stable phenyl rings adjacent to the sulfone. This direct copolymerization method leads to increased acidity of the proton-conducting sites, improved thermal and mechanical stability, precise control of the ion exchange capacity, and therefore control over the proton conductivity, water sorption and morphology of the membrane.

One of the primary disadvantages of all sulfonated poly (arylene ether sulfone)s studied to date is their low proton conductivity at low relative humidity. It has been proposed by the Department of Energy and several automobile manufacturers that operation of fuel cells at high temperature (>80° C.) and low relative humidity can resolve several issues, but particularly water management. High temperature fuel cell operation also alleviates carbon monoxide poisoning of the platinum catalysts in the electrodes and improves the kinetics of the reactions. On the other hand, perfluorinated sulfonic acid membranes, such as Nafion®, display improved proton conductivity at low humidity. This inherently good proton conductivity at low humidity may be a result of the highly acidic sulfonic acid moiety and also the position of the acid.

The "superacid" site is located on a side chain of the Teflon-like backbone, adjacent to an electron withdrawing —$CF_2$— group. The flexibility of the side-chain allows for the aggregation of the sulfonic acid sites into channels, which facilitate proton conduction. However, the proton conductivity of Nafion® is reduced above 100° C. under hydrated conditions due to morphological relaxations.

SUMMARY OF THE INVENTION

An exemplary object of this invention is to provide a new class of polymeric materials, such as, for example, sulfonated poly(arylene ether sulfone) copolymers, where sulfonic acid sites are present on a pendent ring. By placing the acidic sites on, for example, a pendent phenyl-ether functionality, higher proton activities may be achieved due to aggregation of the sulfonic acids. Therefore, such materials have particular utility in the creation of PEMs, as well as in other applications.

Another exemplary object of this invention is to provide polymeric materials having a sulfone moiety connected to a phenyl ring in the polymer backbone or "main chain"through an ether linkage.

Yet another exemplary object of this invention is to provide PEMs which utilize materials having polymeric materials having a sulfone moiety connected to a phenyl ring in the polymer main chain through an ether linkage, and particularly to PEMs which utilize polymeric materials with ether connected sulfonated pendent rings.

Still another exemplary object of this invention is to provide a method of forming sulfonated polymeric materials having sulfone moieties connected to the main chain polymer through the ether linkage. Another exemplary object of this invention is to provide a method of forming sulfonated polymeric materials, such as for example, sulfonated poly(arylene ether sulfones) (PAES), with sulfone moieties on pendent rings.

According to the invention, polymeric materials with pendent sulfone moieties connected to phenyl groups in the main chain are prepared by formulating alkoxy functionalized phenyl groups in the main chain, converting the alkoxy moieties to hydroxyls, and then derivatizing the polymer by adding a pendent sulfone moiety through an ether linkage at the hydroxyl sites. Preferably, the sulfone moiety is part of a pendent ring compound which can be substituted or unsubstituted with, for example, one or more fluorines, other halogens, hydroxyls, or short chain alkyls ($C_{1-6}$). In the preferred embodiment, the polymeric materials may be poly(arylene ether sulfones). The sulfonated polymeric materials so prepared have excellent properties which enable their use in PEMs.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
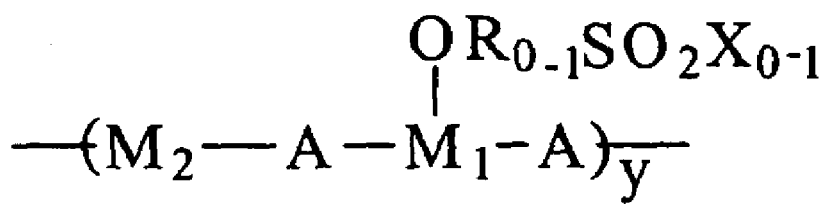
FIG. 1 is a generalized structural drawing of the polymeric materials according to the present invention.

FIG. 1 shows a generalized structural drawing of a polymeric compound according to the invention. The polymeric compounds will have an ether or thioether linkage A between a first monomeric unit M1, and a second monomeric unit M2. The first monomeric unit M1 must include at least one phenyl moiety and may take a variety of forms including, for example, a hydroquinone. The phenyl moiety of the first monomeric unit M1 is joined to the oxygen "O"such that the sulfone "$RSO_2X$"is connected to the polymeric compound through an ether linkage. The second monomeric unit M2 preferably includes at least one aromatic group (e.g., a phenyl), but may take the form of any element andlor molecule which can be joined to the first monomeric unit M2 through an ether or thioether linkage A. The number of repeats y can vary widely depending on the application, and will preferably be in excess of 10 or in excess of 100, and may preferably range between 10 and 1,000 or 10 and 10,000, for example. In the practice of this invention, the first monomeric unit M1 and the second monomeric unit M2 may be the same or different (and are preferably different in the preferred embodiment), and each can include one, two, or three or more phenyl groups together with alkyl, sulfur, amino, ketone, and other moieties, and the polymer or copolymer may take the form of a variety of engineering plastics including, for example, polyether ketones (PEKs), polyether ether ketones (PEEKs), polyarylene ether ketones (PAEK), polyketones (PK), polyether sulfones (PES), polysulfones (PS), bridged polyphenylene sulfide (PPS), polyphenylene ethers (PPE), etc.

In the preferred embodiment, R is a substituted or unsubsituted ring (e.g., phenyl, fluorophenyl, etc.); however, the R could be absent (i.e., $R_0$) or it could be an alkyl moiety (e.g, $C_{1-6}$) in the practice of the invention. The properties (water sorption and proton conductivity) of sulfonated poly(arylene ether sulfone) membranes depend largely on the preparation method. The properties of the polymers contemplated by this invention which are sulfonated at the ether linked pendent group may be different from the main-chain sulfonic acid containing copolymers. Thus, by placing the acidic sites on a pendent phenyl-ether functionality, for example, higher proton conductivities may be achieved due to aggregation of the sulfonic acids. In the preferred embodiment, the sulfone group can be a sulfonic acid (X=OH), a charged species as part of a salt (e.g., X=ONa, OK, ONH$_4$), or simply a charged species (X$_0$).

Figure 2:
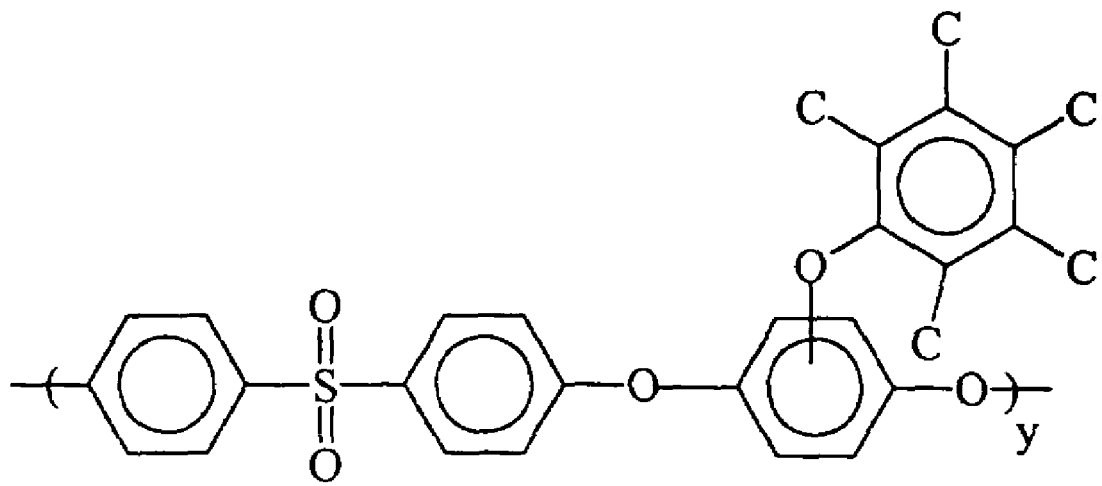
FIG. 2 is a generalized structural drawing of an exemplary sulfonated poly(arylene ether sulfone) according to a preferred embodiment of the invention.

FIG. 2 shows a particular example of one type of polymer compound within the ambit of the present invention, FIG. 2 shows a sulfonated poly(arylene ether sulfone) wherein the first monomeric unit M1' is a hydroquinone, and the second monomeric unit M2" is a sulfone having two phenyl moieties. The first monomeric unit M1' has a pendent phenyl ring that is substituted at at least one position "C"with a sulfone moiety (SO$_2$X$_{0-1}$, where X is either not present (X$_0$) or is OH, ONa, OK, ONH$_4$, or an alternative cationic species with a single positive charge). The remaining C positions (if any) may be hydrogens, halogens (e.g., fluorine has preferred properties), or other substituents (e.g., hydroxyls, short chain alkyls (C$_{1-3}$), etc.). It should be understood that the phenyl ring may be substituted with the sulfone moiety at any of the ortho, meta or para positions, and in some applications para substitution may be preferred. As discussed in more detail above, the second monomeric unit M$_2$' could take a number of different forms. For example, the linkage between the phenyls could be a propyl (i.e., a Bisphenol A monomer), a non-oxidized sulfur, etc.

Figure 3:
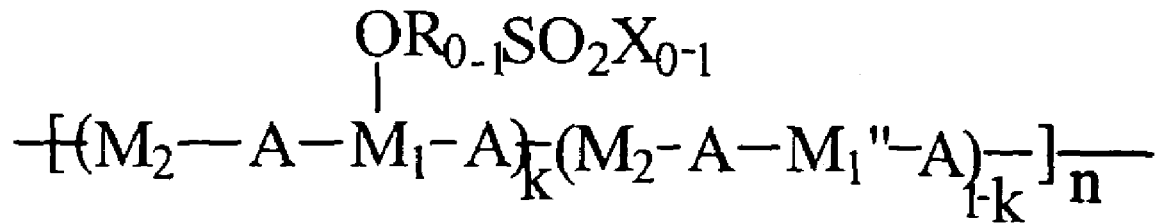
FIG. 3 is a generalized structural drawing of a copolymer according to the present invention.

FIG. 3 shows a copolymer with ether connected sulfonated pendent groups in the first monomeric unit M1, as described above in conjunction with FIG. 1. FIG. 3 also shows that the ratio of first monomeric unit M1 in the copolymer, relative to the other monomeric units therein, may be adjusted up or down during synthesis by copolymerizing the first monomeric unit M1 with the second monomeric unit M2 and a third monomeric unit M1" which is preferably the same as M1 but it is not substituted with a sulfonated pendent group (e.g., an unsubsituted hydroquinone). However, it should be understood that the third monomeric unit M1" could be structurally different from the first monomeric unit M1. The number of monomeric units in the copolymer of FIG. 3 may preferably range from 10 to 100, 1000, or 10,000, as discussed in conjunction with FIG. 1, and the ratio of the monomeric units relative to each other can be varied (i.e., k could range from 0.01 to 0.99) so as to control the number of possible sulfonated pendent groups in the copolymer. As will be discussed in conjunction with the exemplary compounds synthesized and tested below, good results are obtained when 10% or more, and more preferably 20 or 30% or more, of the first monomer unit M1 is substituted with a sulfonated pendent group.

A practical nomenclature for the exemplary poly(arylene ether sulfone) copolymers described below is as follows. All of the copolymers are referred to as HQS because they are all synthesized with hydroquinone (HQ) and they are all sulfones (S). The symbolism X-YY is used and this designates a situation where X refers to the pendent group [methoxy (MHQS), hydroxyl (HOHQS), benzenesulfonic acid (SHQS), tetrafluorobenzenesulfonic acid (FHQS)] and YY is the mole percent of the pendent group relative to DCDPS. For example, MHQS-40 describes the methoxy-containing poly (arylene ether sulfone) copolymer that incorporates 40 mol % of methoxyhydroquinone and 60 mol % of hydroquinone. Once this copolymer is treated with boron tribromide, for example, to convert the alkoxy (e.g., methoxy) groups to hydroxyl substituents, the copolymer nomenclature would be HOHQS-40. If HOHQS-40 was reacted with sodium 4-nitrobenzenesulfonate, the copolymer would be called SHQS-40; and if HOHQS-40 was reacted with barium pentafluorobenzenesulfonate, the copolymer would be called FHQS-40.

Materials 4,4'-Dichlorodiphenylsulfone (DCDPS, Solvay Advanced Polymers) was dried at 60° C. under vacuum before use. Hydroquinone (Eastman Chemical) and methoxyhydroquinone (Aldrich) were dried at room temperature under vacuum. Potassium carbonate and barium pentafluorobenzenesulfonate were vacuum dried at 120° C. 4-Nitrobenzenesulfonyl chloride, sodium chloride, toluene, boron tribromide, and chloroform were used as received from Aldrich. N-methyl-2-pyrrolidinone (Aldrich) and N,N-dimethylacetamide were distilled from calcium hydride under vacuum before use.

Monomer Synthesis: Preparation of Sodium 4-Nitrobenzenesulfonate

4-Nitrobenzenesulfonyl chloride (10 g, 45 mmol) and 20 mL of deionized water were added to a 100-mL round bottom flask equipped with a condenser and stirbar. The mixture was stirred and heated to reflux. After four hours, the reaction was filtered to remove any insoluble impurities and cooled to room temperature. The product was "salted out" of solution by addition of sodium chloride, filtered, and dried at 120° C. under vacuum.

Yield 9.85 g (97%); $^{13}$C NMR (100 MHz, DMSO, d$_6$) 155 ppm (1C), 147 ppm (1C), 127 ppm (2C), 124 ppm (2C).

Copolymerization of Methoxy-Containing Poly(arylene ether sulfone)s

A typical copolymerization of a methoxy-PAES with 50 mol % methoxy groups is discussed (MHQS-50) for exemplary purposes. DCDPS (4.000 g, 14 mmol), hydroquinone (0.7669 g, 7 mmol), and methoxyhydroquinone (0.9760 g, 7 mmol) were introduced to a 250-mL, three neck flask equipped with a mechanical stirrer, Dean-Stark trap, condenser, and a nitrogen inlet/outlet. Potassium carbonate (2.22 g, 16 mmol) and 29 mL of NMP were added to the reaction flask to afford a 20% (w/v) solid concentration. Toluene (15 mL) was added to the flask as an azeotroping agent. The Dean-Stark trap was filled with toluene and the reaction mixture was heated to 140° C. to dehydrate the system. After 4 h at 140° C., the Dean-Stark trap was emptied and the oil bath temperature was heated to 180° C. for 20 h. The resulting viscous solution was cooled to room temperature and precipitated into an excess of deionized water. The precipitated copolymer was collected by filtration and purified in a Soxhlet extractor with deionized water for 2 days. The resulting white, fibrous copolymer (MHQS-50) was dried under vacuum at 110° C. for at least 24 h. Yield 96%.

While methoxy-containing PAES is described above, the procedure should be applicable to other alkoxy-containing PAES polymers, such as, for example, short chain ethoxy and propoxy containing PAES polymers.

Conversion of Methoxy (Alkoxy) to Hydroxyl Groups

A typical reaction for converting MHQS-30 to HOHQS-30 is given for exemplary purposes. MHQS-30 (1.000 g) was dissolved into 20 mL of chloroform in a 100-mL, three neck flask equipped with a stirbar and nitrogen purge. BBr$_3$ (0.5 mL in 10 mL chloroform) was added dropwise to the reaction via a syringe. The reaction mixture was allowed to stir overnight at room temperature. The copolymer was isolated by filtration, washed with methanol (2×) and deionized water (2×), and finally dried under vacuum at 120° C. Yield 98%.

It should be understood that other techniques or additives for converting the methoxy (alkoxy) to a hydroxyl group may also be employed in the practice of this invention. The important feature in synthesis is that polymerization provides an alkoxy moiety on a phenyl in the main chain. This later allows formation of hydroxyls at the same site, and finally an ether connected sulfonated pendent group (e.g., a sulfonated pendent ring).

Preparation of SHQS-XX Sulfonated Copolymers

HOHQS-30 (1.0000 g) and 4-nitrophenylsulfonic acid sodium salt (0.6100 g) were introduced to a 100-mL, three neck flask equipped with a mechanical stirrer, Dean-Stark trap, condenser, and a nitrogen inlet/outlet. Potassium carbonate (0.48 g) and 10 mL of DMAc were added to the reaction flask to afford a 15% (w/v) solid concentration. The reaction mixture was heated to 80° C. for 72 h. The resulting viscous solution was cooled to room temperature and precipitated into an excess of deionized water. The precipitated copolymer was collected by filtration and purified in a Soxhlet extractor with deionized water for 2 days. The resulting white, fibrous copolymer (MHQS-30) was dried under vacuum at 110° C. for at least 24 h.

Yield 98%.

Preparation of FHQS-XX Sulfonated Copolymers

HOHQS-30 (1.00 g) and PFBS (1.1512 g) were added to a 100-mL three-neck round bottom flask equipped with a mechanical stirrer, condenser, and a nitrogen inlet/outlet. Potassium carbonate (0.1260 g) and NMP (16 mL) were added to the reaction flask to afford a 10% (w/v) solid concentration. The reaction mixture was heated to 80° C. for 72 h. The resulting viscous solution was precipitated into 0.5M $H_2SO_4$, vacuum filtered, washed with deionized water (3×) and dried under vacuum at 110° C. for at least 24 h. Yield 97%.

Membrane Preparation and Acidification

Solutions of the copolymers were prepared by dissolving the copolymer in dimethylacetamide. The solutions were filtered and cast onto clean glass substrates. The solvent was evaporated with an infrared light for 24 hours. The sulfonate salt-form membrane was then acidified in 1.5 M sulfuric acid for 24 hours at room temperature, followed by immersion in deionized water for 24 hours at room temperature.

Characterization $^1$H NMR spectra were recorded on a Varian Unity 400 instrument operating at 399.952 MHz in deuterated dimethylsulfoxide (DMSO-$d_6$). Infrared measurements were performed on a Nicolet Impact 400 FT-IR Spectrometer from solution cast films of polymers. Intrinsic viscosity (IV) measurements were conducted in NMP at 25° C. using a Cannon Ubbelohde viscometer. Thermo-oxidative behavior of the acid-form of the copolymers was measured on a TA Instruments TGA Q 500. Samples were dried directly in the TGA furnace at 200° C. for 2 h prior to analysis to remove water. The copolymers were evaluated from 50° C. to 800° C. in air at a heating rate of 10° C./minute. The ion-exchange capacities (IEC) of the acid forms of the membranes were determined by nonaqueous potentiometric titration using an MCI Automatic Titrator Model GT-05. The acidified membranes were dissolved in DMAc and titrated with a standard tetramethylammonium hydroxide (TMAH) solution. The water sorption values of the sulfonated polyimide copolymers were determined at 30° C. The membranes were vacuum-dried at 120° C. for 24 h, weighed and immersed in deionized water at room temperature for 24 h. The wet membranes were wiped dry and quickly weighed again. The water uptake of the membranes was calculated in weight percent as follows:

$$\text{water uptake} = [(\text{mass}_{wet} - \text{mass}_{dry})/\text{mass}_{dry}]*100$$

Proton conductivity measurements were performed on membranes after being soaked in deionized water for 3 days at 30° C. An impedance spectrum was recorded from 10 MHz to 10 Hz using a Hewlett-Packard 4129A Impedance/Gain-Phase Analyzer. The cell geometry was chosen to ensure that the membrane resistance dominated the response of the system. The resistance of the membrane was taken at the frequency which produced the minimum imaginary response. All impedance measurements were performed under fully hydrated conditions. The proton conductivity was taken as the reciprocal of the resistance and reported in units of Siemens per centimeter (S/cm).

Results

It is well known in the area of nonlinear optics (NLO) that polyimides with NLO chromophore side chains can be incorporated into the polymer chain by direct copolymerization or post-derivatization. A common synthetic route for nonlinear optical polyimides is the direct polymerization of dianhydrides with diamines containing an NLO chromophore via a poly(amic acid) prepolymer. This method, however, often involves a tedious synthesis of the chromophore-containing diamine monomers. Sometimes, the fact that few chromophores can survive the relatively harsh chemical conditions of the monomer synthesis limits the kind of chromophores that are incorporated in the polyimide backbone. To avoid the synthesis of chromophore-containing diamine compounds, an alternate synthetic route was developed (see, Chen et al. *Macromolecules* 29:535-539 (1996)). A one-pot preparation of a pre-imidized, hydroxyl-containing polyimide was developed, followed by the covalent attachment of a chromophore to the backbone of the polyimide.

The inventors herein contemplated that this post-derivatization method may also have an application in the synthesis of proton exchange membranes for fuel cells. Instead of bonding the NLO chromophore to the polymer backbone, ion-conducting sites could be introduced. Unfortunately, the hydrolytic stablility of sulfonated polyimides under fuel cell conditions is unsatisfactory. On the other hand, poly(arylene ether sulfone)s are good film-forming materials with high thermal stability, good oxidative and hydrolytic stability, and have largely been researched as candidates for PEMs.

Hydroxyl-containing poly(arylene ether sulfone)s cannot be prepared directly due to the high reactivity of phenolic groups in the nucleophilic aromatic substitution reaction, which would result in highly branched polymers. Therefore, the copolymers must be prepared in the protected methoxy form (or an alternative alkoxy form, e.g., ethoxy or propoxy), followed by conversion to the reactive hydroxyl form in a post-polymerization reaction.

Figure 4:
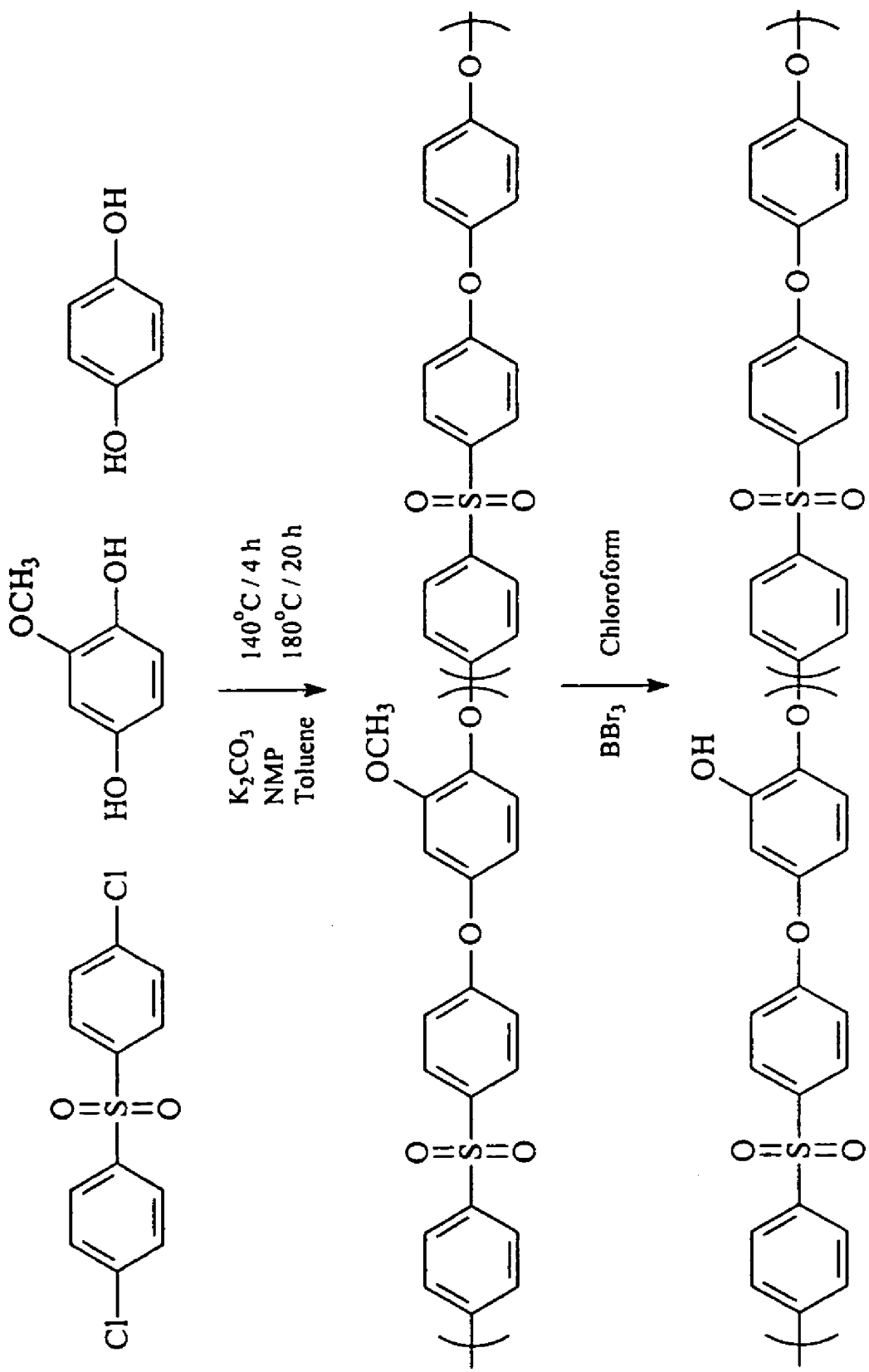
FIG. 4 illustrates a synthetic pathway for the direct synthesis of methoxy-containing poly(arylene ether sulfone)s and conversion to hydroxyl containing copolymers.

FIG. 4 shows, as an example, how poly(arylene ether sulfone) copolymers with pendent methoxy groups were synthesized by nucleophilic substitution of 4,4'-dichlorodiphenylsulfone, hydroquinone, and methoxyhydroquinone. The methoxy groups are not reactive under nucleophilic aromatic substitution conditions, so high molecular weight linear polymers were obtained. The molar ratio of methoxyhydroquinone to hydroquinone was changed to produce a systematic series of poly(arylene ether sulfone) copolymers with varying amounts of methoxy groups. Potassium carbonate was selected as the weak base since it has been previously shown to facilitate the substitution reaction while minimizing side reactions. In addition, potassium carbonate has limited reactivity towards aryl halides at low temperatures, allowing the complete generation of the bis-phenate before the temperature is increased to initiate substitution. High molecular weight copolymers were synthesized in N-methylpyrrolidinone at 180° C. and characterized by intrinsic viscosity and ¹H NMR. Table 1 shows selected properties of MHQS-XX copolymers (including intrinsic viscosity (IV) for the copolymer compositions described above.

TABLE 1

Selected properties of MHQS-XX copolymers

| Copolymer Composition | IV (dL/g) | % Methoxy Groups via ¹H NMR | 5% Weight Loss Temperature (° C.)* | Char Yield (%)* | $T_g$ (° C.) |
|---|---|---|---|---|---|
| 10 | 0.80 | 8 | 408 | 2.5 | 202 |
| 20 | 0.83 | 18 | 410 | 2.2 | 298 |
| 30 | 0.83 | 30 | 406 | 2.5 | 195 |
| 40 | 0.81 | 39 | 408 | 2.1 | 195 |
| 50 | 0.84 | 46 | 408 | 2.9 | 200 |

*TGA samples were heated at 10° C./min. in air.

The incorporation of the methoxyhydroquinone was found to be quantitative through integration of the peak at 3.6 ppm with respect to one in the aromatic region (7.9 ppm).

All of the MHQS-XX copolymers were soluble in chlorinated solvents; therefore the conversion of the methoxy groups to reactive hydroxyl groups using BBr₃ was conducted in chloroform. Due to the polar nature of the hydroxyl groups, the subsequent HOHQS-XX copolymers were not soluble in chloroform allowing for straightforward isolation. As can be seen from Table 2, the intrinsic viscosity of the HOHQS-XX copolymers was higher than the MHQS-XX copolymers in all cases.

TABLE 2

Selected properties of HOHQS-XX copolymers

| Copolymer Composition | IV (dL/g) | % Methoxy Groups via ¹H NMR | 5% Weight Loss Temperature (° C.)* | Char Yield (%)* | $T_g$ (° C.) |
|---|---|---|---|---|---|
| 10 | 1.05 | 8 | 402 | 0.22 | 205 |
| 20 | 1.00 | 21 | 400 | 0.57 | 208 |
| 30 | 1.09 | 27 | 409 | 0.95 | 211 |
| 40 | 1.02 | 38 | 399 | 0.43 | 216 |
| 50 | 1.30 | 45 | 404 | 0.01 | 218 |

*TGA samples were heated at 10° C./min. in air.

This effect is possibly due to hydrogen bonding of the hydroxyl groups.

Figure 5:
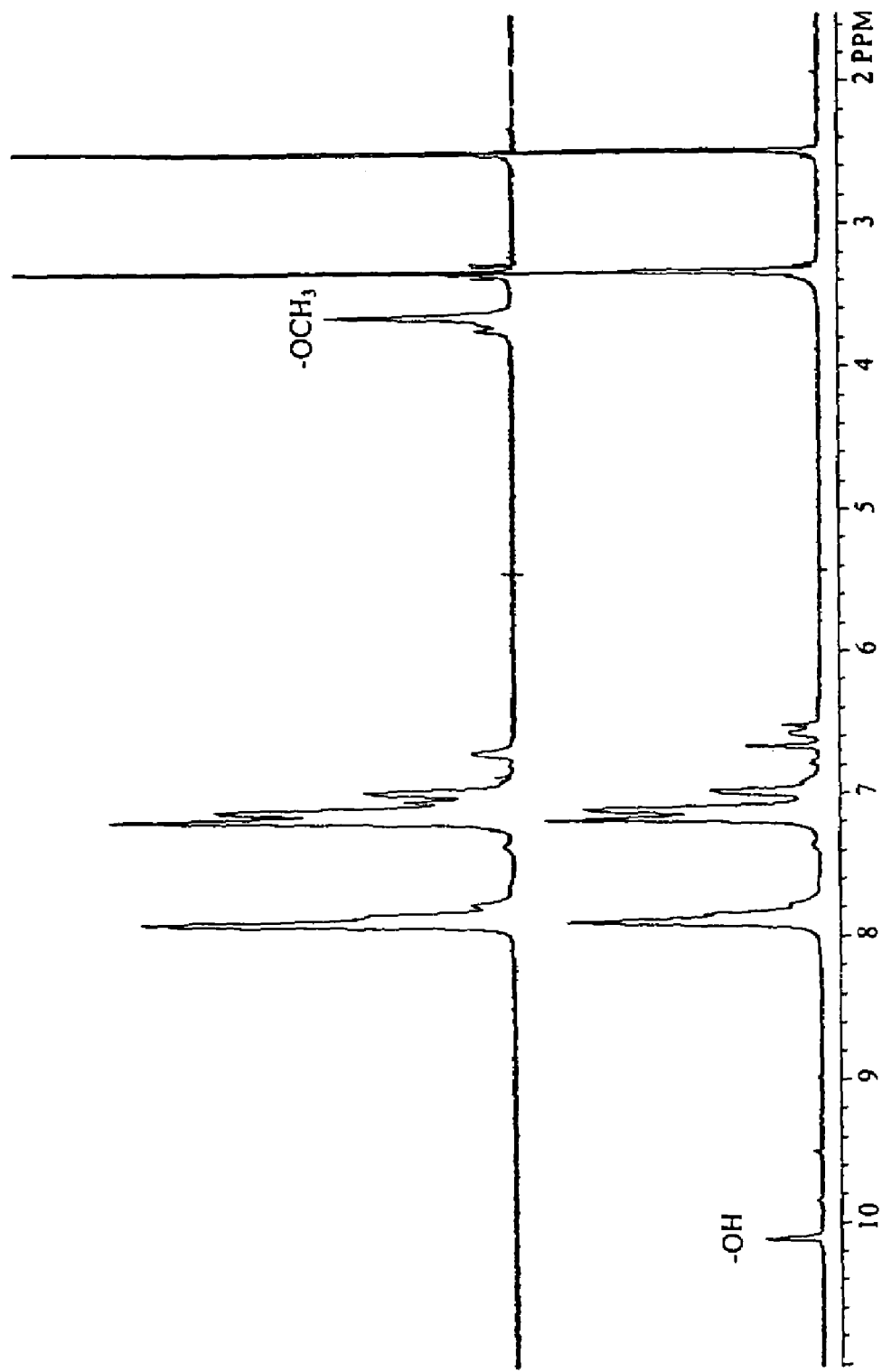
FIG. 5 are $^1H$ NMR spectra of MHQS-40 (top) and HOHQS-40 (bottom)
Figure 6:
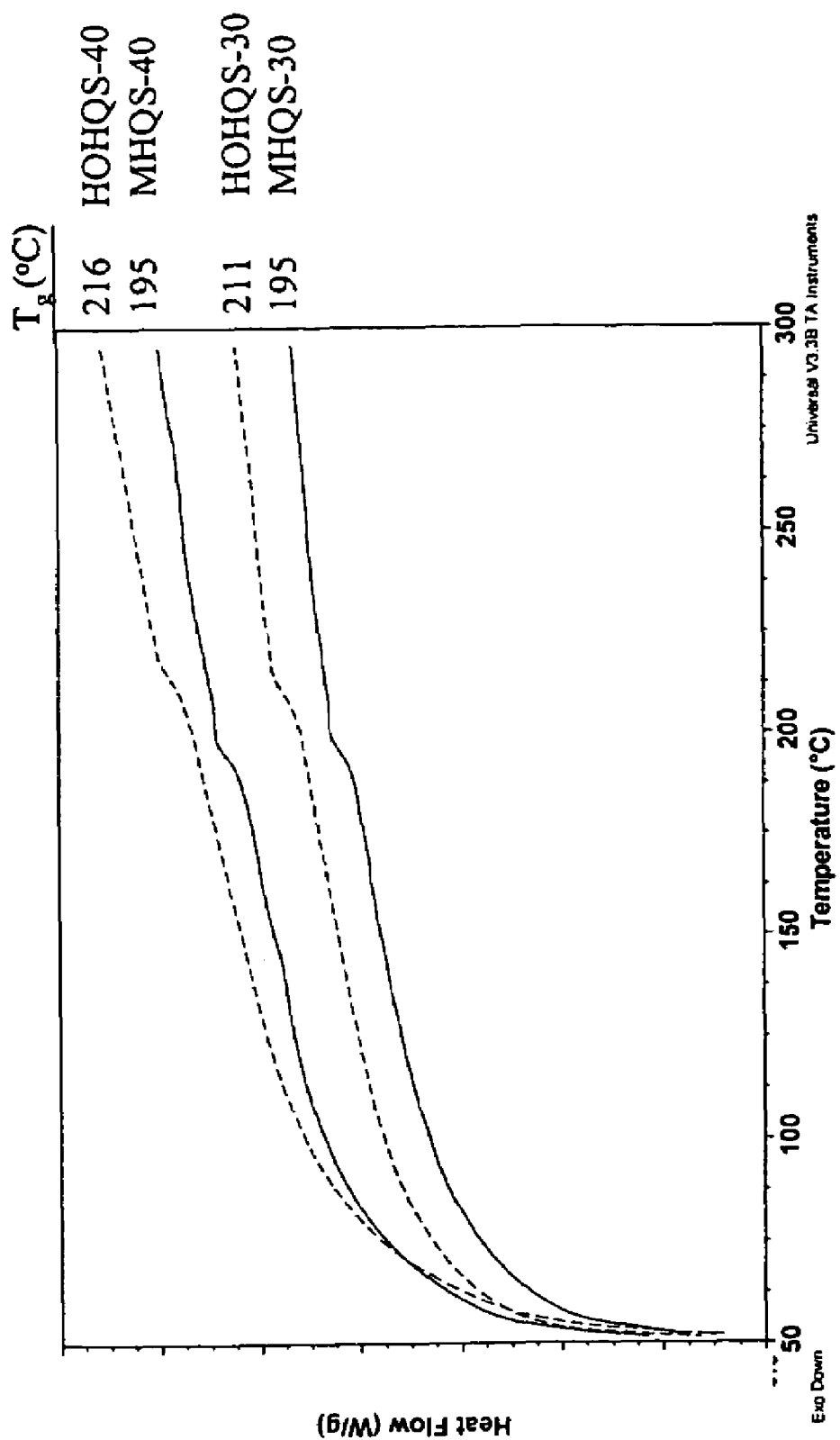
FIG. 6 are representative differential scanning calorimetry (DSC) curves of methoxy- and hydroxyl-containing copolymers.
Figure 7:
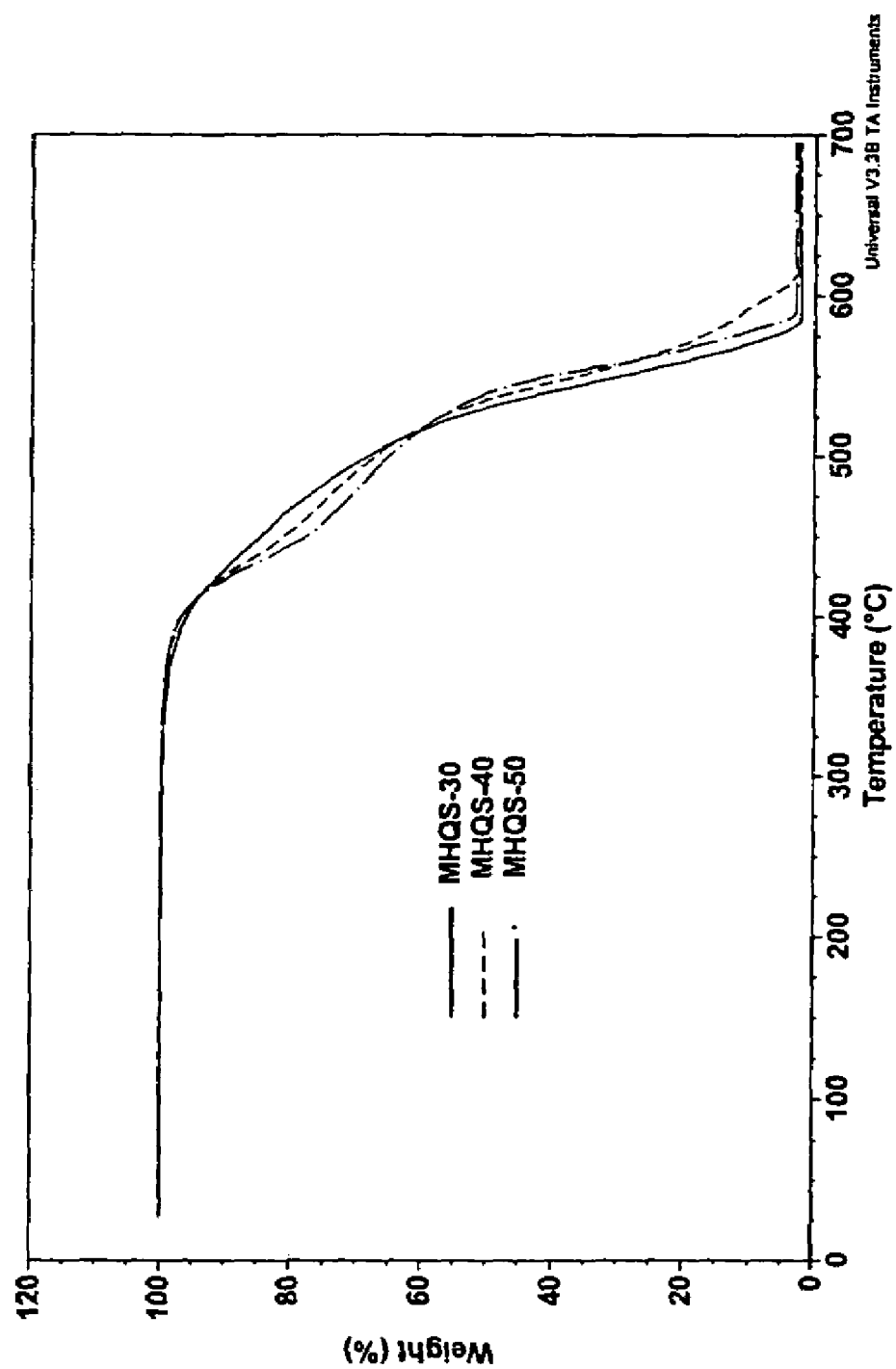
FIG. 7 are thermogravimetric analysis (TGA) plots of methoxy-containing poly(arylene ether sulfone) copolymers.
Figure 8:
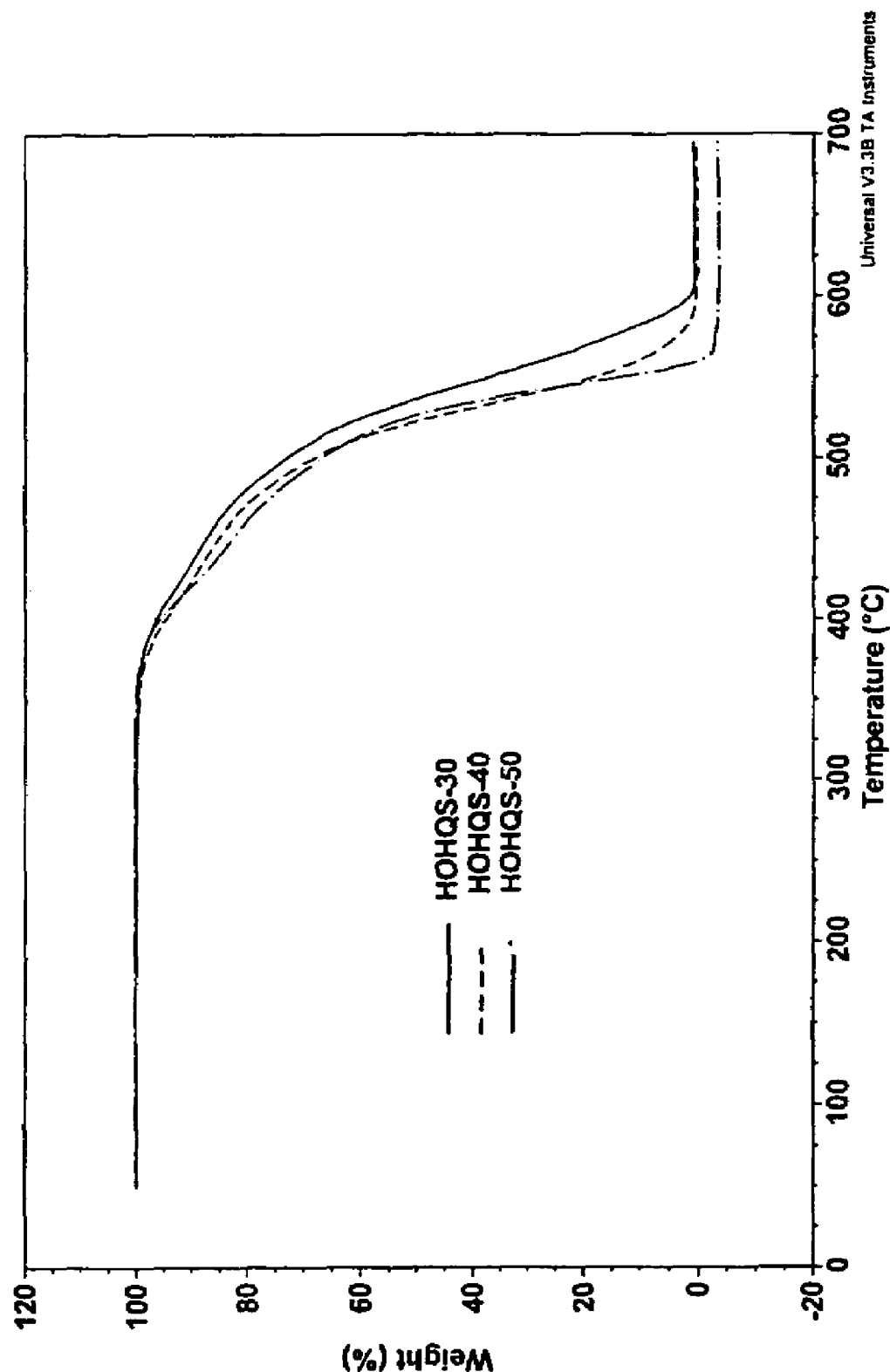
FIG. 8 are TGA plots of hydroxyl-containing poly(arylenene ether sulfone) copolymers.

The quantitative conversion of methoxy groups to hydroxyl groups was determined by ¹H NMR, and FIG. 5 shows the spectra of MHQS-40 (top) and HOHQS-40 (bottom). The complete disappearance of the protons of the methoxy group (3.6 ppm) and appearance of a peak at ~10 ppm (due to —OH) was observed for all the copolymers. Additionally, as illustrated in the differential scanning calorimetry (DSC) curves presented in FIG. 6, an increase in the glass transition temperatures of the HOHQS-XX copolymers with respect to the MHQS-XX copolymers can be attributed to hydrogen bonding which decreases chain mobility. With reference back to Table 2, the $T_g$ also increased as more hydroxyl groups were introduced to the polymer backbone. FIGS. 7 and 8 shows the thermal stability of the MHQS-XX and HOHQS-XX copolymers were analyzed by thermogravimetric analysis in air. Both series of copolymers showed similar TGA profiles (5% weight loss temperatures and char yield) indicating that the methoxy and hydroxyl substituents did not influence the thermal stability.

Figure 9:
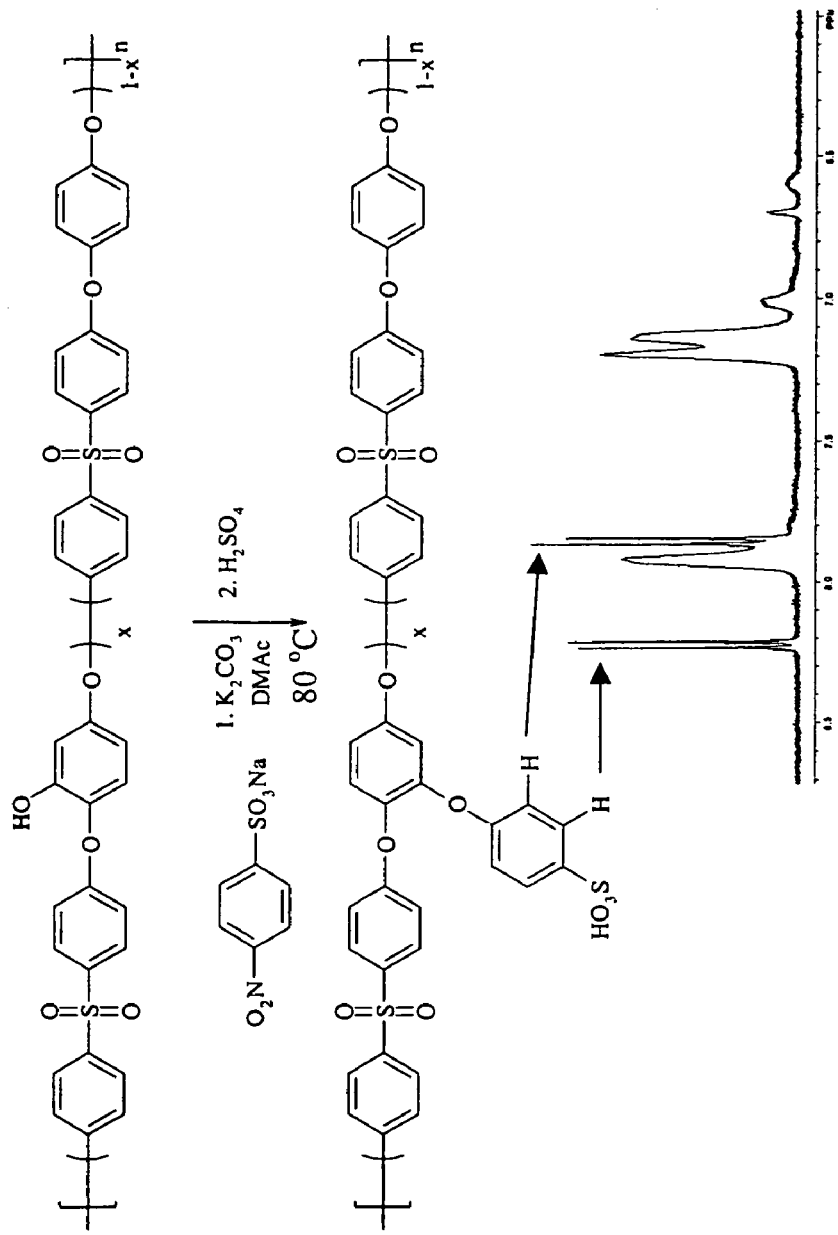
FIG. 9 shows the synthesis of sulfonated poly(arylene ether sulfone) copolymers (SHQS-XX) and $^1H$-NMR of SHQS-30 identifying hydrogen peaks of the sulfonated, ether linked ring pendent group.
Figure 10:
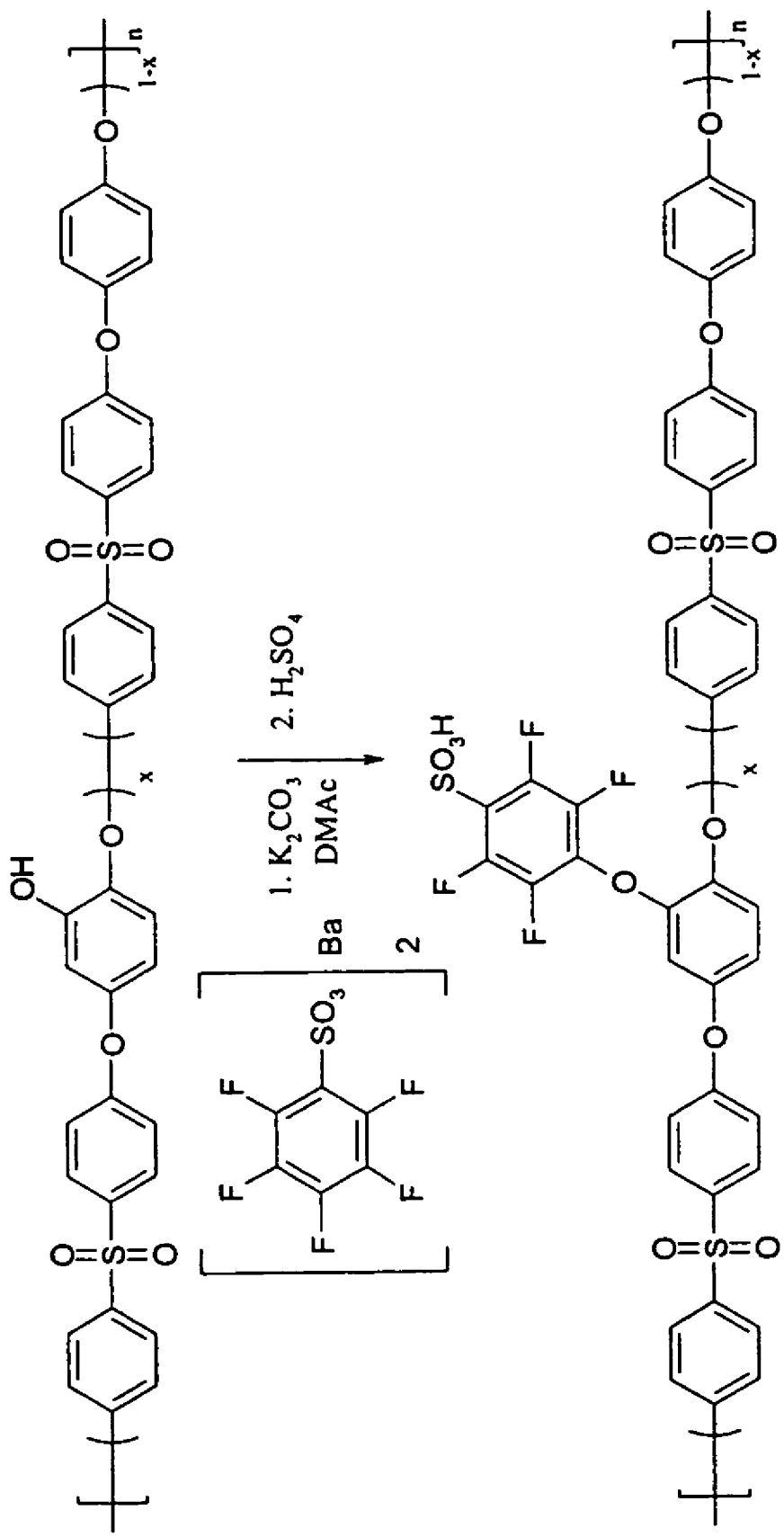
FIG. 10 shows the synthesis of fluorine-containing poly (arylene ether sulfone)s (FHQS-XX)

FIGS. 9 and 10 respectively show the synthesis of sulfonated poly(arylene ether sulfone) copolymers and fluorine containing sulfonated poly(arylene ether sulfone) copolymers, respectively. The hydroxyl-containing copolymers were reacted under nucleophilic conditions with either sodium 4-nitrobenzenesulfonate (SHQS-XX) or barium pentafluorobenzenesulfonate (FHQS-XX) to prepare sulfonated copolymers. The derivatization reactions were only heated to 80° C. to minimize the ether-ether interchange reactions that could possibly occur. Additionally, in the case of the reactions of barium pentafluorobenzenesulfonate with HOHQS, low temperature was needed to provide materials that did not crosslink. Highly fluorinated monomers are very reactive, so typically reaction temperatures are kept below 100° C. These two series of copolymers (SHQS-XX and FHQS-XX), were used to establish how the acidity of the sulfonic acid group influences the PEM's properties, i.e. water uptake and proton conductivity. Both series of sulfonated copolymers were prepared with ion-exchange capacities ranging from 0.3 to 0.8 meq/g. FIG. 9 shows that the incorporation of sodium 4-nitrobenzenesulfonate was quantitative as shown by the additional ¹H NMR peaks at 7.85 and 8.2 ppm, with respect to the parent polymer.

Figure 11:
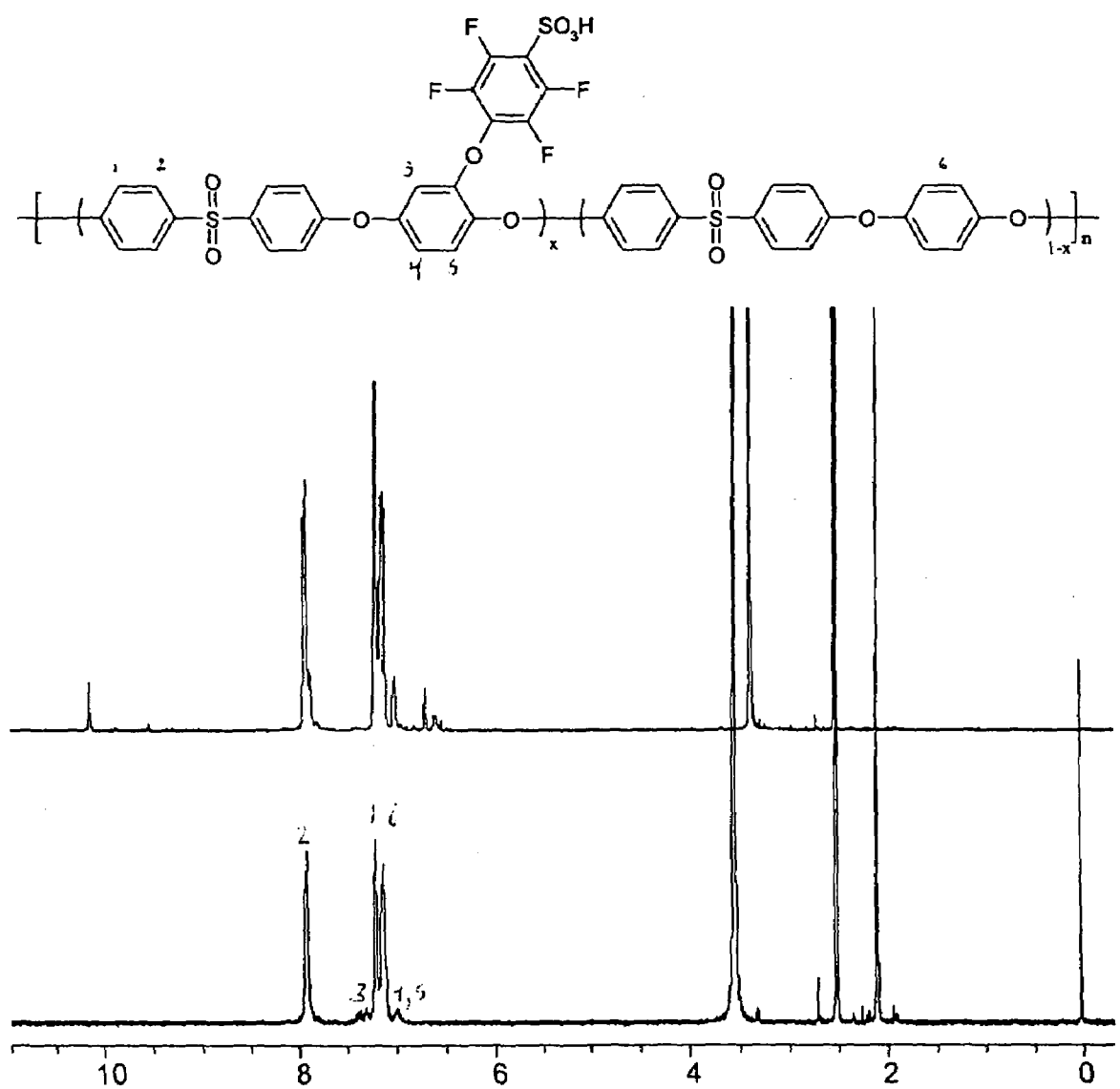
FIG. 11 shows $^1H$ NMR spectra of HOHQS-30 (top) and FHQS-30 (bottom) and specifically relates certain peaks in the spectra to hydrogens in the exemplary copolymer with a pendent sulfonated ring moiety depicted therewith.
Figure 12:
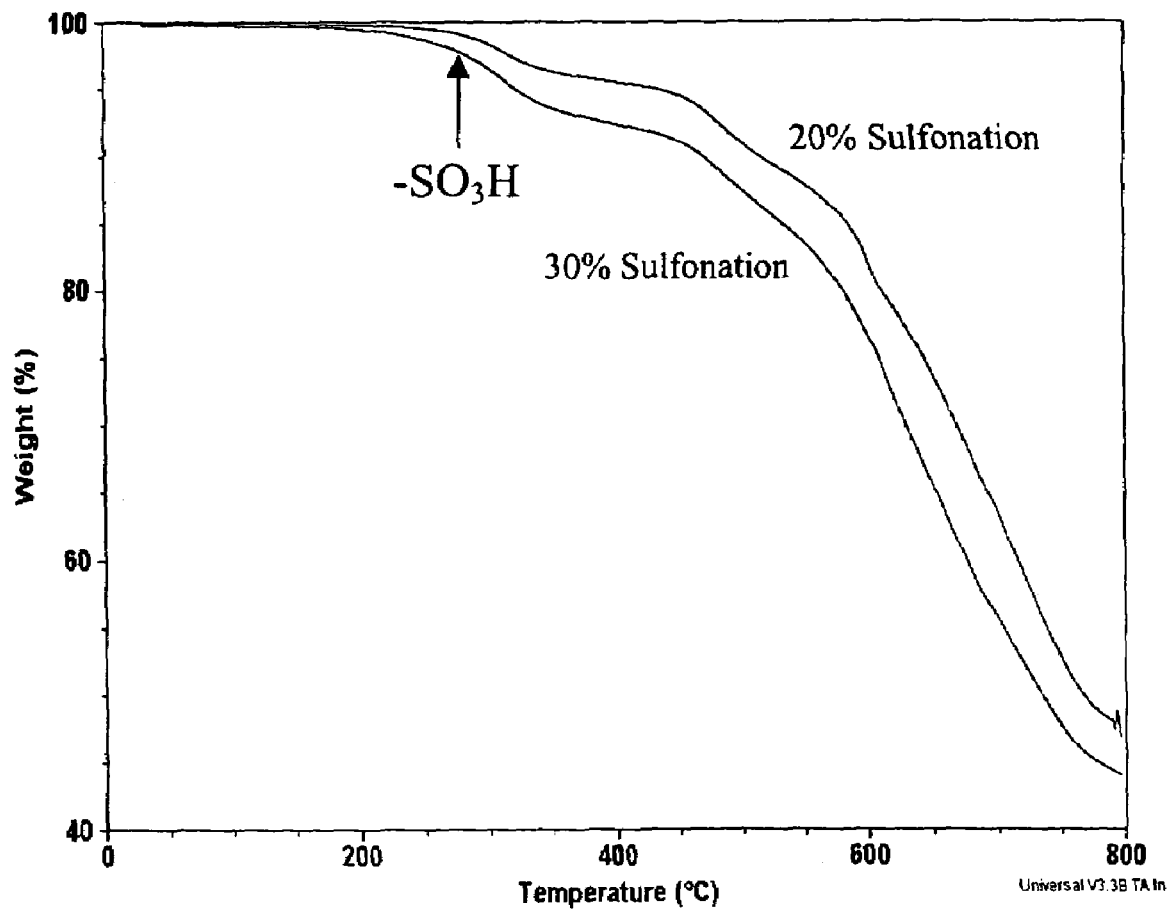
FIG. 12 shows the TGA profile of FHQS-20 (top) and FHQS-30 (bottom) determined at a rate of 10° C./min. in air.

FIG. 11 shows that since barium pentafluorobenzenesulfonate has no hydrogens that could be monitored via ¹H NMR, the disappearance of the hydroxyl peak at 10 ppm and the shift of the protons on the adjacent benzene ring clearly showed that the reaction proceeded as expected. Additionally, FIG. 12 shows that the FT-IR displayed additional absorbances at 1030 cm⁻¹ and 1098 cm⁻¹ corresponding to the symmetric and asymmetric stretching of sulfonic acid groups. The TGA profile also showed the characteristic drop at ~250° C. due to the loss of sulfonic acid groups.

Figure 13:
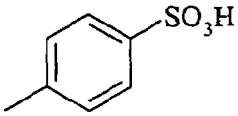
FIG. 13 presents a table illustrating selected properties of sulfonated poly(arylene ether sulfone) copolymers.
Figure 13:
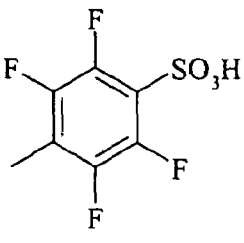

The high molecular weight sulfonated copolymers formed clear transparent, tough, ductile membranes when solution cast from N,N-dimethylacetamide. The water sorption and proton conductivities of the copolymers were determined after soaking the membranes in deionized water at 30° C. for 48 hours. FIG. 13 presents comparative properties of the sulfonated poly(arylene ether sulfone) copolymers which have been produced and tested. The proton conductivities of both series of copolymers were fairly low (1-8 mS/cm), particularly when compared to Nafion (100 mS/cm). However, the water uptake and proton conductivity values are similar to previously studied poly(arylene ether sulfone)s prepared by direct copolymerization at equivalent ion exchange capacities.

In summary, high molecular weight, film-forming sulfonated poly(arylene ether sulfone) copolymers were prepared in three steps; copolymerization, deprotection, and functionalization. The reactions were monitored via IV, NMR, FT-IR, TGA, and DSC. While the sulfonic acid-functionalized copolymers prepared and tested displayed relatively low proton conductivities (probably due to the low ion exchange capacities of the materials), other polymers within the scope of the appended claims may have higher ion exchange capacities which would improve the proton conductivity. The methodology for preparing the materials of this invention is applicable to a broad family of polymers, and these materials may be useful in PEMs and in other applications. The process may be practiced using a two component polymerization as well as a three component co-polymerization (co-polymerization being preferred), and it being understood that within the context of this invention the step of polymerizing includes co-polymerization. What is required is to have a monomer with at least one phenyl that is substituted with an alkoxy group (e.g., methoxy, ethoxy, or propoxy).

After polymerization, the alkoxy is converted to a hydroxyl, thereby deprotecting the oxygen. This allows the polymer thus formed to be functionalized at the oxygen with a pendent sulfone moiety, with pendent sulfone substituted aromatic rings being preferred.

While the invention has been described in terms of its preferred embodiments, those skilled in the art will recognize that the invention can be practiced with modification within the spirit and scope of the appended claims.

What is claimed is:

1. A proton exchange membrane which includes a polymer or co-polymer material selected from the group consisting of:

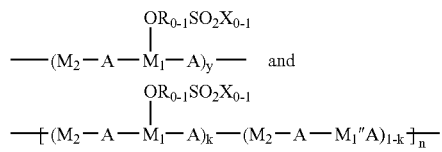

where
$M_1$ is a monomer having at least one phenyl group wherein the oxygen of the ether linkage of the pendent sulfone group is linked to said at least one phenyl group,
$M_2$ is a monomer having either or both alkyl or aromatic groups,
$M_1''$ is a monomer having either or both alkyl or aromatic groups,
A is an ether or a throatier linkage,
$R_{0-1}$ is a substituted or unsubstituted alkyl or aromatic group,
$X_{0-1}$ is either a charged species ($X_0$) or is oxygen with a single positive charge cation, and
y and n may be the same or different and are at least 10, and k is a number less than one.

2. The proton exchange membrane of claim 1, wherein said $R_{0-1}$ moiety is a phenyl group.

3. The proton exchange membrane of claim 1, wherein said $X_{0-1}$ is oxygen together with a moiety selected from the group consisting of hydrogen, sodium, potassium, or ammonium.

4. The proton exchange membrane of claim 1, where $M_1$ and $M_1''$ are the same except for the ether linked pendent sulfone group.

5. The proton exchange membrane of claim 1 wherein $M_2$ includes at least one aromatic moiety.

6. The proton exchange membrane of claim 1, wherein the polymer or copolymer is a poly(arylene ether sulfone).

7. The proton exchange membrane of claim 6, wherein said poly(arylene ether sulfone) is fluorinated.

8. A polymer or co-polymer material selected from the group consisting of:

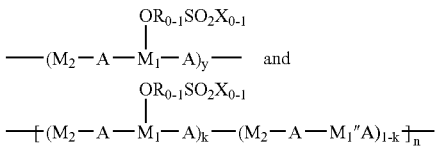

where
$M_1$ is a monomer having at least one phenyl group wherein the oxygen of the ether linkage of the pendent sulfone group is linked to said at least one phenyl group,
$M_2$ is a monomer having either or both alkyl or aromatic groups,
$M_1''$ is a monomer having either or both alkyl or aromatic groups,
A is an ether or throatier linkages,
$R_{0-1}$ is a substituted or unsubstituted alkyl or aromatic group,
$X_{0-1}$ is either a charged species ($X_0$) or is oxygen with a single positive charge cation, and
y and n may be the same or different and are at least 10, and k is a number less than one.

9. The polymer or copolymer material of claim 8, wherein said $R_{0-1}$ moiety is a phenyl group.

10. The polymer or copolymer material of claim 8, wherein said $X_{0-1}$ is oxygen together with a moiety selected from the group consisting of hydrogen, sodium, potassium, or ammonium.

11. The polymer or copolymer material of claim 8, where $M_1$ and $M_1''$ are the same except for the ether linked pendent sulfone group.

12. The polymer or copolymer material of claim 8, wherein $M_2$ includes at least one aromatic moiety.

13. The polymer or copolymer material of claim 8, wherein the polymer or copolymer is a poly(arylene ether sulfone).

14. The polymer or copolymer material of claim 13 wherein said poly(arylene ether sulfone) is fluorinated.

* * * * *